Jan. 15, 1935.  L. E. SMITH  1,988,254
POWER DRIVEN POTATO DIGGER
Filed Feb. 9, 1931  2 Sheets-Sheet 1

Inventor
Lewis E. Smith
By N.P. Doolick
Atty.

Jan. 15, 1935.  L. E. SMITH  1,988,254
POWER DRIVEN POTATO DIGGER
Filed Feb. 9, 1931  2 Sheets-Sheet 2

Inventor
Lewis E. Smith
By H. Doolittle
Atty.

Patented Jan. 15, 1935

1,988,254

UNITED STATES PATENT OFFICE 1,988,254

POWER DRIVEN POTATO DIGGER

Lewis E. Smith, Auburn, N. Y., assignor to International Harvester Company, a corporation of New Jersey Application February 9, 1931, Serial No. 514,347

5 Claims. (Cl. 55—51)

This invention relates to a power driven potato digger. More specifically it relates to such a potato digger embodying a variable speed transmission.

In the operation of the shaker chain type of potato digger, in which the potatoes with the surrounding dirt are elevated on a shaker chain to remove the dirt, the speed and amount of shaking required depends upon various factors, such as the condition of the soil. As it is desirable to operate the shaker chain at the lowest rate of speed which will effectively remove the dirt from the potatoes and prevent bruising and other injuries to the potatoes, the present means has been devised to provide for variable speed of the shaking chain.

The principal object of the invention is, therefore, to provide a change speed transmission for operating the mechanisms of a potato digger at different rates of speed relative to the forward movement of the digger. This object is accomplished by mounting a change speed transmission in the power drive connections.

The drawings illustrate a particular form of two-row digger, the frame construction and driving means of which are shown and claimed in a co-pending application, Serial No. 514,422 filed February 9, 1931, now Patent No. 1,888,504, issued November 22, 1932. Only such elements are shown in this application as are necessary to illustrate this invention.

Figure 1:
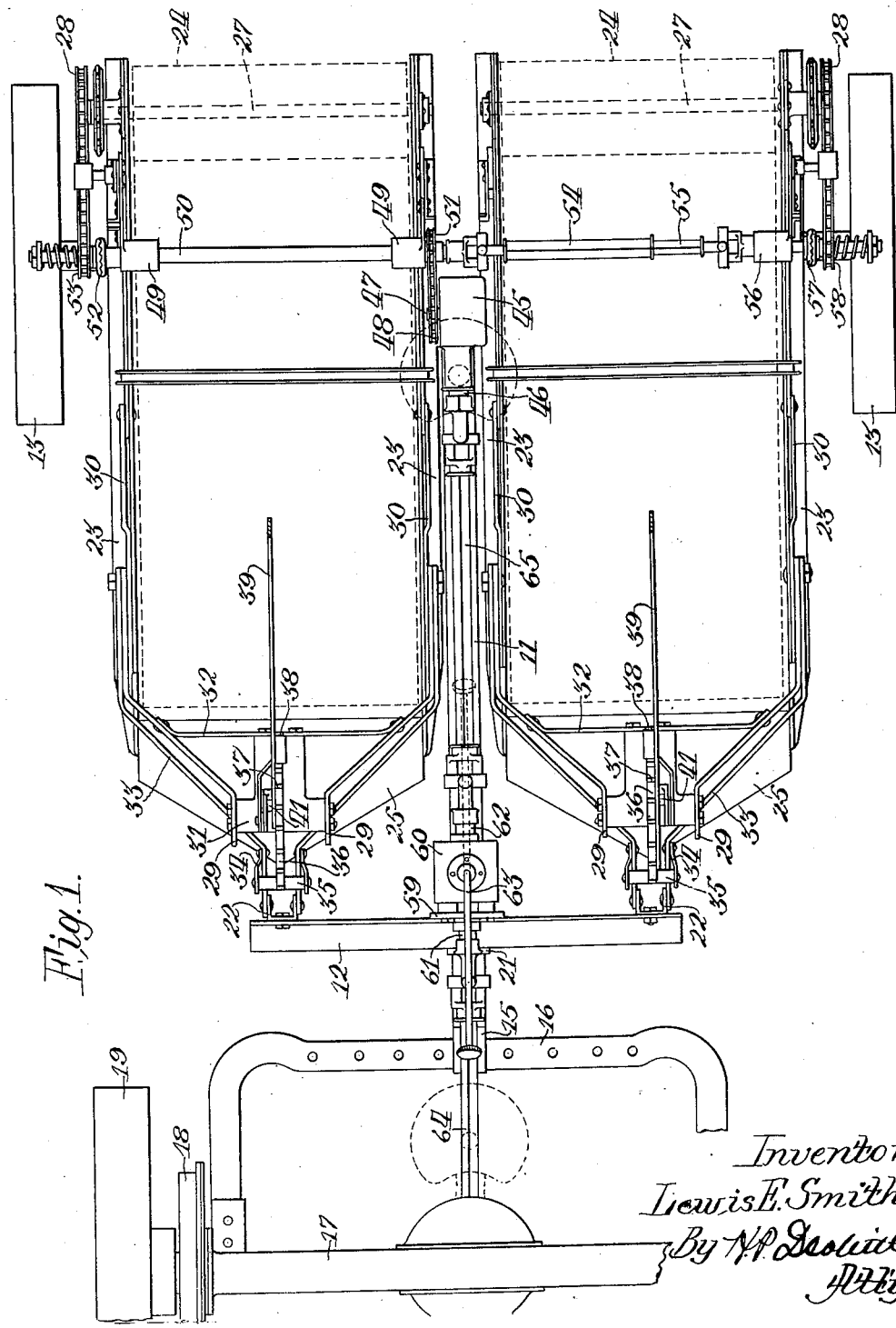
Figure 2:
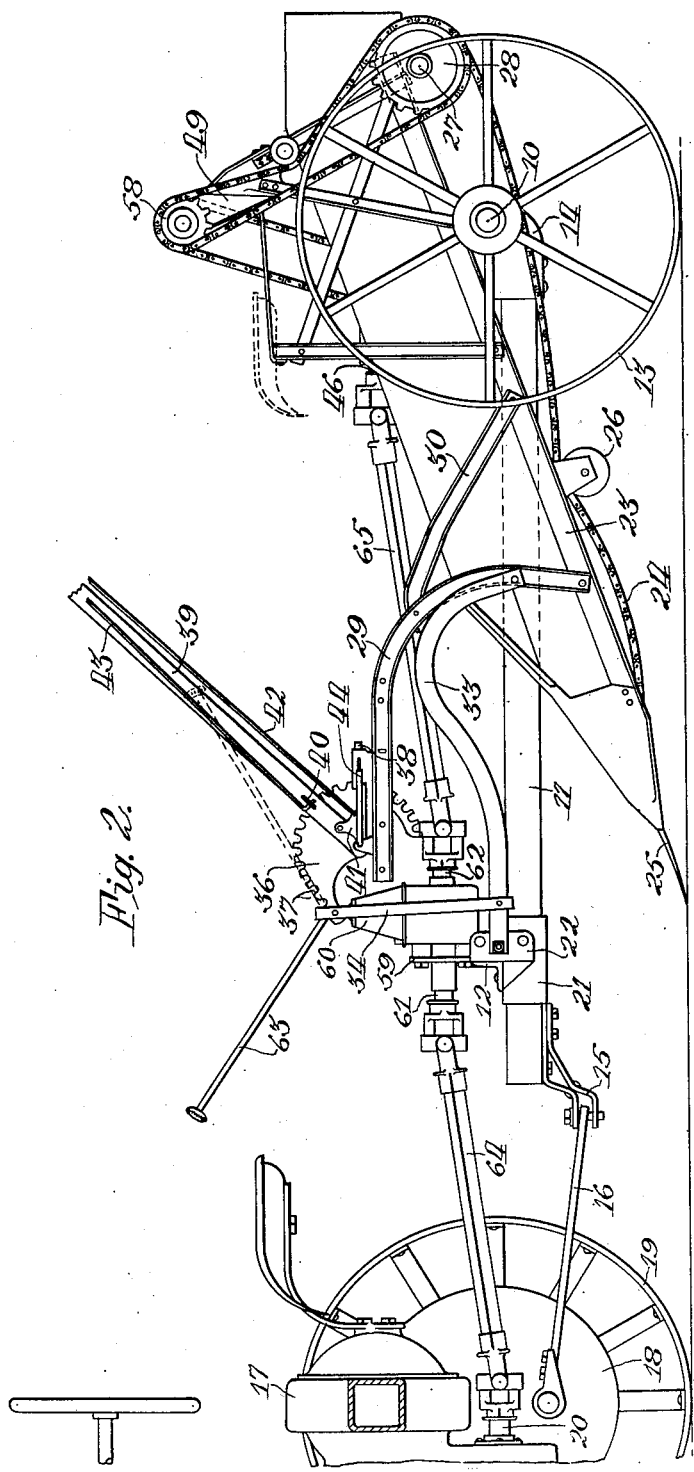

Figure 1 is a plan view of a digger, embodying the invention and also showing the rear portion of a tractor to which the digger may be attached; and Figure 2 is a side elevation of the construction shown in Figure 1.

The supporting frame structure for the potato digger illustrated consists of a transversely extending axle 10, a centrally forwardly extending member 11, and a transversely extending bar 12 positioned at the forward end of the member 11. Supporting wheels 13 are rotatably mounted at the ends of the axle 10. The central member 11 is rigidly secured to a casting 14 which is, in turn, rigidly secured to the axle 10, forming a T-shaped frame structure on which the digger units are mounted. The member 11 is tubular in form and is of a substantial diameter, thereby forming a strong central support. At the forward end of the member 11 bars 15 are secured and shaped to form a clevis which is adapted to be secured to the drawbar 16 of a tractor. The tractor is of a well known type, having an arched rear axle consisting of an axle housing 17 and downwardly depending housings 18 on which the wheels 19 are mounted. The drawbar 16 is mounted on the lower portions of the housings 18. A power take-off shaft 20 extends rearwardly beneath the axle housing 17 from the transmission housing of the tractor. At the forward end of the member 11 a casting 21, the body portion of which is cylindrical, is fitted over said member and rigidly secured thereto. The casting 21 forms a support for the transverse bar 12. At the ends of the bar 12 brackets 22 are secured for attaching the digger units, as will be hereinafter described. Each of the digger units is provided with a frame, two essential elements of which are the spaced downwardly extending angle bars 23. Said bars are spaced apart a sufficient distance to provide for the operation of shaking chains 24 therebetween. At the forward ends of the bars 23, which are substantially parallel, a digging blade 25 is mounted. The shaking chain 24 is suitably mounted on supporting rollers, such as the roller 26 shown in Figure 2 and the rollers indicated in dotted lines in Figure 1. The digging blade and the shaking chain may be of any well known construction. At the rear of the bars 23 a shaft 27 carries a chain sprocket 28, by which the rear roller drives the shaking chain.

To provide for supporting the digging frames, upwardly and forwardly extending bars 29 are secured to the side bars 23 and are braced by bars 30 connected to the draft bars and to the bars 23. The bars 29 extend centrally inwardly, as shown in Figure 1, and are rigidly secured to a member 31. A cross bar 32 is secured to the bars 29 and to rearward extensions of the member 31, to form a rigid construction. Draft beams 33, pivotally secured to the downwardly extending portions of the bars 29, extend forwardly and inwardly and are pivotally connected to the bracket 22. In respect to their construction and the means by which they are attached to the frame construction, the units and each side of the digger are exactly similar.

At the forward ends of the beams 33 forwardly extending links 34 are pivotally attached. At their upper ends the links are pivotally attached to a transverse portion 35 of a member 36, shaped as a sector and provided with notches 37. The member 36 is pivotally mounted on a transverse axis on an upstanding portion of the member 31. A latch means 38 is also mounted on a portion of the member 31 and is adapted to engage the notches 37. A hand lever 39, pivotally mounted on the same axis as the member 36, is provided with a latch 40 operative to engage the notches 37. A member 41, pivoted on the lever 39, is operative to be manually actuated by a rod 42 extending along the lever. The latch 40 is also operated by a small rod 43 extending along the lever.

The member 41 has an integral forward extension to which a member 44 is pivotally attached on an axis the same as the axis of the member 36. The member 44 extends rearwardly and is adapted to operate the latch 38.

On one of the digger frames at the inner side thereof, a gear case 45 is mounted on a supporting bracket rigidly secured to the digger frame. The gear casing contains suitable gears for transmitting power from a horizontally positioned forwardly extending shaft 46 to a transversely extending shaft 47 on which a chain sprocket 48 is mounted. Bearing brackets 49, mounted above the frame of the digger unit on which the gear casing 45 is mounted, provide means for rotatably mounting a transversely extending shaft 50. At the inner end of this digger unit the shaft 50 is provided with a chain sprocket 51 positioned in alignment with the chain sprocket 48 and driven by a chain therefrom. At the outer end of the digger unit the shaft 50 is provided with a slip clutch 52, from which power is transmitted to a chain sprocket 53. The chain sprocket 53 is mounted in alignment with the chain sprocket 28 on the shaft 27 and drives said sprocket and shaft by means of a chain. An idler pulley is provided for maintaining the chain at the proper tightness.

At the center of the digger between the two units the shaft 50 extends beyond the sprocket 51 and is connected by means of a universal joint to a splined shaft 54. The splined shaft 54, as the terminology signifies, is constructed in two sections to provide for axial movement, whereby a variation in length may be brought about. A shaft 55 is connected to the shaft 54 through a slip clutch 57. The shaft 55 drives a chain sprocket 58, mounted in alignment with the chain sprocket 28 on the shaft 27 of the second digger unit, and drives said sprocket and shaft by means of a chain. At the forward end of the frame structure the casting 21 has an upward extension 59, to which a transmission housing 60 is rigidly secured. A shaft 61 extends forwardly from said transmission housing and a shaft 62 extends rearwardly therefrom. The transmission which is preferably used in this invention is of the conventional type having three speeds forward and one speed reverse. A gear shift control lever 63 extends upwardly forwardly or rearwardly, as desired. As illustrated the control lever 63 extends towards the tractor and within reach of the operator's station thereon. The forwardly extending shaft 61 is connected by a universal joint to a splined shaft 64, which is connected at its other end by a universal joint to the power take-off shaft 20. These elements form a flexible drive connection between the transmission and the power take-off shaft. The rearwardly extending shaft 62 is connected by a universal joint to a splined shaft 65, which is connected at its other end by a universal joint to the shaft 46, previously described.

In the operation of the digger, as above described, power is applied through the power take-off shaft 20 through the shafts 64 and 61, to the transmission housing, which may be termed as a change speed transmission. From said transmission through the shafts 62, 65 and 46, power is transmitted to the gear casing 45. By means of the transverse shaft 47 and the shaft sprockets and the chain, power is transmitted to the shaft 50. At the outer end this shaft drives the shaker mechanism on the unit at that side through the sprockets 53 and 28 and the shaft chain. At its inner end the shaft 50 drives the shaft 54, through which power is transmitted for operating the smaller power transmitting means on the unit at that side. The change speed transmission contained in the housing 60 provides means, during uniform motion of the tractor, for varying the speed of the shaking chains 24. The chains may be operated at any one of the three forward speeds of the transmission, which is so positioned that said speeds will deliver an upward motion to the top side of the shaker grate. The reverse speed on the transmission provides for reversal of the shaker chains 24 when larger amounts of material accumulate thereon and fail to disintegrate during the normal upward movement. With the provision of the change speed transmission the functioning of the power operated digger, as shown, has been greatly improved because of the advantage of the different speeds at which chains may be operated.

It is to be understood that applicant has shown only a preferred embodiment of his invention and that the elements making up the invention may be embodied in other types of potato diggers where their utility will be equally advantageous.

What is claimed is:

1. A potato digger comprising a wheel supported frame, potato digging means mounted on said frame, an upwardly and rearwardly extending shaking and conveying chain positioned to receive material from the digging means and operative to separate the potatoes from said material, and means on the frame structure for driving said chain, said means including means for reversing the direction of travel of the chain whereby an excess amount of foreign material may be conveyed downwardly when the capacity of the shaking chain to separate the potatoes has been exceeded.

2. A potato digger comprising a wheel supported frame, potato digging means mounted on said frame, an upwardly and rearwardly extending shaking and conveying chain positioned to receive material from the digging means and operative to separate the potatoes from said material, receiving means positioned to receive potatoes from said chain, and means on the frame structure for driving said chain, said means including means for reversing the direction of travel of the chain whereby an excess amount of foreign material may be conveyed downwardly when the capacity of the shaking chain to separate the potatoes has been exceeded.

3. A potato digger comprising, in combination with a tractor having a power take-off shaft, a wheel supported frame connected to the tractor, potato digging means mounted on said frame, an upwardly and rearwardly extending shaking and conveying chain positioned to receive material from the digging means and operative to separate the potatoes from said material, receiving means positioned to receive potatoes from said chain, and means on the frame structure for driving said chain from the power take-off shaft, said means including means for reversing the direction of travel of the chain whereby an excess amount of foreign material may be conveyed downwardly when the capacity of the shaking chain to separate the potatoes has been exceeded.

4. The combination with a tractor having a power take-off, of a potato digger comprising a wheel supported frame, potato digging means mounted on said frame, an upwardly and rearwardly extending shaking and conveying chain positioned to receive material from the digging means and operative to separate the potatoes from said material, and means on the frame structure for driving said chain, said means including, in combination, an extensible shaft connecting with the power take-off, a transmission means in series permitting the conveying chain to be run at variable speeds upwardly, reversed, or stopped in neutral, an extensible shaft connecting a gear box to the transmission, a transverse shaft driven from the gear box, friction clutch means on said transverse shaft driving said conveying chain whereby said conveying chain may stop when overloaded although the said transverse shaft continues to revolve in its regular direction to drive the conveying chain upwardly or in a reverse direction to free the conveying chain when it is clogged when said transmission means is reversed.

5. The combination with a tractor having a power take-off, of a potato digger comprising a wheel supported frame, potato digging means mounted on said frame, upwardly and rearwardly extending shaking and conveying chains positioned to receive material from the digging means and operative to separate the potatoes from said material, and means on the frame structure for driving said conveying chains, said means including, in combination, an extensible shaft connecting with the power take-off, a transmission means in series permitting the conveying chains to be run at variable speeds upwardly, reversed, or stopped in neutral, an extensible shaft connecting a gear box to the transmission, a transverse shaft driven from the gear box, said transverse shaft comprising a fixed length shaft overlying one conveying chain and an extensible shaft overlying the other conveying chain, friction clutch means on both said transverse shafts driving said conveying chains whereby either of said conveying chains may stop when overloaded although the said transverse shafts continue to revolve in their regular direction to drive said conveying chains upwardly or in a reverse direction to free the conveying chains when they are clogged when said transmission means is reversed.

LEWIS E. SMITH.